United States Patent
Ha et al.

(10) Patent No.: US 9,086,586 B2
(45) Date of Patent: Jul. 21, 2015

(54) LIQUID CRYSTAL DISPLAY MODULE AND METHOD OF FORMING THE SAME

(75) Inventors: Kyoung Jin Ha, Uiwang-si (KR); Ji Hye Kwon, Uiwang-si (KR); Lee June Kim, Uiwang-si (KR); Kil Sung Lee, Uiwang-si (KR)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 75 days.

(21) Appl. No.: 13/332,634

(22) Filed: Dec. 21, 2011

(65) Prior Publication Data

US 2012/0169961 A1    Jul. 5, 2012

(30) Foreign Application Priority Data

Dec. 31, 2010    (KR) .................. 10-2010-0140389

(51) Int. Cl.
*G02F 1/1335*    (2006.01)
*G02F 1/1333*    (2006.01)

(52) U.S. Cl.
CPC ............... *G02F 1/133308* (2013.01); *G02F 2001/133317* (2013.01); *G02F 2202/022* (2013.01)

(58) Field of Classification Search
USPC .......................................................... 349/61
See application file for complete search history.

(56) References Cited

U.S. PATENT DOCUMENTS

| | | | |
|---|---|---|---|
| 2007/0013292 A1* | 1/2007 | Inoue et al. ................ | 313/504 |
| 2007/0035950 A1 | 2/2007 | Yang | |
| 2009/0185101 A1* | 7/2009 | Matsuhira et al. ......... | 349/58 |
| 2011/0062864 A1* | 3/2011 | Shimizu et al. ............ | 313/506 |
| 2011/0117296 A1* | 5/2011 | Jang et al. ................. | 428/1.33 |
| 2011/0285934 A1* | 11/2011 | Watanabe .................. | 349/58 |

FOREIGN PATENT DOCUMENTS

| | | |
|---|---|---|
| CN | 1282066 A | 1/2001 |
| CN | 1987612 A | 6/2007 |
| CN | 101533174 A | 9/2009 |
| JP | 06-148633 A | 5/1994 |
| JP | 2003-107432 A | 4/2003 |
| JP | 2007-042552 A | 2/2007 |
| TW | 201014889 A | 4/2010 |
| WO | WO-2010/089998 A1 | 8/2010 |

OTHER PUBLICATIONS

Korean Office Action Dated May 16, 2013.
Chinese Office Action Dated Dec. 3, 2013.
Office Action mailed Jul. 25, 2014 in corresponding Taiwanese Patent Application No. 100148356.

* cited by examiner

*Primary Examiner* — Timothy L Rude
(74) *Attorney, Agent, or Firm* — Lee & Morse, P.C.

(57) ABSTRACT

A liquid crystal display module includes a backlight unit, a liquid crystal display panel on a top surface of the backlight unit, and a thermoplastic layer on at least one lateral surface of the backlight unit and at least one lateral surface of the liquid crystal display panel, the thermoplastic layer including a solidified thermoplastic resin exhibiting viscosity of about 300 cps to about 1,000 cps at a temperature of about 120° C. to about 130° C.

12 Claims, 2 Drawing Sheets

LIQUID CRYSTAL DISPLAY MODULE AND METHOD OF FORMING THE SAME

BACKGROUND

1. Field

Example embodiments relate to a liquid crystal display module and a method of forming the same. More specifically, example embodiments relate to a liquid crystal display module having a backlight unit and a liquid crystal display panel secured by a solidified product of a thermoplastic resin, and a method of forming the same.

2. Description of the Related Art

Generally, a liquid crystal display module, e.g., a display of a mobile phone and the like, may include a liquid crystal display panel and a backlight unit. For example, the backlight unit of the liquid crystal display module may include a light source, e.g., a LED, and a plurality of sequentially stacked optical sheets. The optical sheets may be secured by a chassis, e.g., the chassis may constitute an outer appearance of the backlight unit.

SUMMARY

An aspect of the example embodiments provides a liquid crystal display module, including a backlight unit, a liquid crystal display panel on a top surface of the backlight unit, and a thermoplastic layer on at least one lateral surface of the backlight unit and at least one lateral surface of the liquid crystal display panel, the thermoplastic layer including a solidified thermoplastic resin exhibiting viscosity of about 300 cps to about 1,000 cps at a temperature of about 120° C. to about 130° C.

The liquid crystal display module may further include a rim tape between the backlight unit and the liquid crystal display panel.

The backlight unit and the liquid crystal display panel may be secured inside a chassis.

The thermoplastic resin may include at least one of a hot-melt type silicone adhesive, an ethylene-vinyl acetate resin, an ethylene acetate-free vinyl resin, an acrylic resin, a phenolic resin, and an epoxy resin.

The thermoplastic resin may include the hot-melt type silicone adhesive, the hot-melt type silicone adhesive having a weight average molecular weight of about 10,000 g/mol to about 200,000 g/mol.

The thermoplastic resin may include the ethylene-vinyl acetate resin, the ethylene-vinyl acetate resin having a weight average molecular weight of about 10,000 g/mol to about 50,000 g/mol.

The thermoplastic resin may include the phenolic resin, the phenolic resin including at least one of a novolac type phenolic resin and a resol type phenolic resin.

The thermoplastic resin may include the epoxy resin, the epoxy resin including at least one of a bisphenol-A type epoxy resin and a bisphenol-F type epoxy resin.

The thermoplastic layer may further include a light shielding pigment.

The light shielding pigment may include at least one of a black pigment and a white pigment.

The thermoplastic layer may further include a silane coupling agent.

The liquid crystal display module may further include a cured product of a photo curable adhesive composition on the at least one lateral surface of the backlight unit and on the at least one lateral surface of the liquid crystal display panel.

The cured product may directly contact the thermoplastic layer, the backlight unit, the liquid crystal display panel, and a chassis.

The thermoplastic layer may be substantially only on the lateral surfaces of the backlight unit and the liquid crystal display panel, light from the backlight unit being emitted from the top surface of the backlight unit toward a bottom surface of the liquid crystal display panel.

The thermoplastic layer may extend along and directly contacts each of the lateral surfaces of the backlight unit and the liquid crystal display panel, the thermoplastic layer being between the liquid crustal display panel and a lateral side of a chassis.

An aspect of the example embodiments also provides a method of forming a liquid crystal display module, the method including forming a backlight unit, forming a liquid crystal display panel on a top surface of the backlight unit, and forming a thermoplastic layer connecting at least one lateral surface of the backlight unit to at least one lateral surface of the liquid crystal display panel, the thermoplastic layer including a solidified thermoplastic resin exhibiting viscosity of about 300 cps to about 1,000 cps at a temperature of about 120° C. to about 130° C.

Forming the thermoplastic layer may include melting the thermoplastic resin to exhibit the viscosity of about 300 cps to about 1,000 cps, and injecting the molten thermoplastic resin onto the lateral surfaces of the backlight unit and the liquid crystal display panel.

Forming the thermoplastic layer may include injecting a molten thermoplastic resin onto the lateral surfaces of the backlight unit and the liquid crystal display panel to a substantially uniform thickness.

BRIEF DESCRIPTION OF DRAWINGS

Features will become apparent to those of ordinary skill in the art by describing in detail exemplary embodiments with reference to the attached drawings, in which.

DETAILED DESCRIPTION

Figure 1:
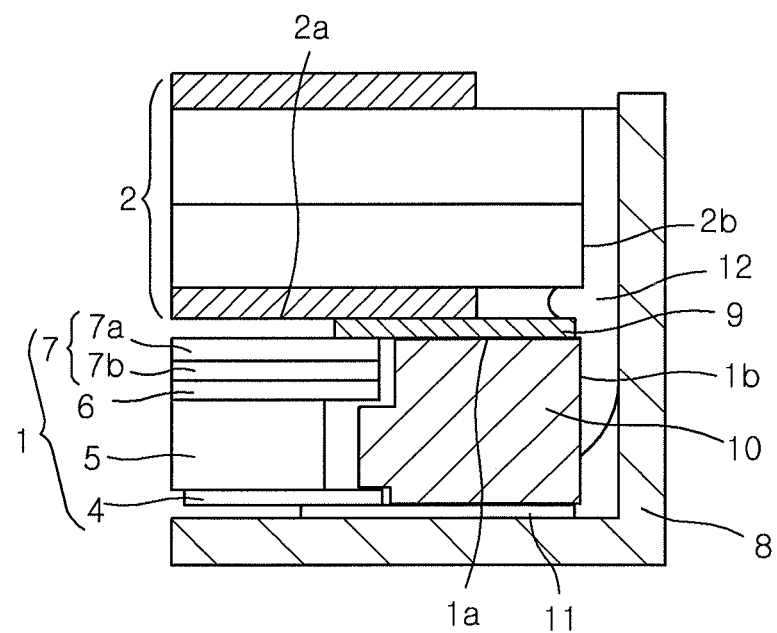
FIG. 1 illustrates a partial cross-sectional view of a liquid crystal display module in accordance with an exemplary embodiment.

Korean Patent Application No. 10-2010-0140389, filed on Dec. 31, 2010, in the Korean Intellectual Property Office, and entitled: "Liquid Crystal Display Module and Liquid Crystal Display Including the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer (or element) is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

A liquid crystal display module according to an example embodiment may include a liquid crystal display panel on a backlight unit. The backlight unit and the liquid crystal display panel may be secured to each other by a solidified product of a thermoplastic resin, which has a viscosity of about 300 cps to about 1,000 cps at a temperature of about 120° C. to about 130° C. Herein, the term "solidified product" refers to material formed from solidification of a molten thermoplastic resin, e.g., a solidified thermoplastic resin.

That is, the liquid crystal display module may include a backlight unit and a liquid crystal display panel stacked on a top surface of the backlight unit, i.e., so light from the backlight unit is emitted from the top surface of the backlight unit toward a bottom surface of the liquid crystal display panel. The liquid crystal display module may further include a solidified product of a thermoplastic resin, which has a viscosity of about 300 cps to about 1,000 cps at a temperature of about 120° C. to about 130° C. The solidified product of the thermoplastic resin may be deposited on at least one lateral side including the backlight unit and the liquid crystal display panel to facilitate connection between the backlight unit and the liquid crystal display panel without minimizing area of surfaces transmitting light.

The liquid crystal display module according to an example embodiment will be described in more detail with reference to FIG. 1. FIG. 1 illustrates a partial cross-sectional view of a liquid crystal display module in accordance with an example embodiment.

Referring to FIG. 1, the liquid crystal display module may include a backlight unit 1 and a liquid crystal display panel 2 stacked on a top surface 1a of the backlight unit 1. The backlight unit 1 may include a light source, e.g., a LED, a reflective sheet 4, a light guide plate 5, a diffuser sheet 6, prism sheets 7 including a horizontal prism sheet 7a and a vertical prism sheet 7b, and a white frame 10 shielding light.

A rim tape 9 may be interposed between the backlight unit 1 and the liquid crystal display panel 2, e.g., only between the top surface 1a of the backlight unit 1 and a bottom surface 2a of the liquid crystal display panel 2. For example, the rim tape 9 may be deposited only along a perimeter or only along disconnected peripheral portions of the top surface of the backlight unit 1. The rim tape 9 allows the backlight unit 1 and the liquid crystal display panel 2 to be stably stacked.

For example, the rim tape 9 may be a double-sided adhesive tape, so one side of the rim tape may 9 be attached to a part of the top surface 1a of the backlight unit 1 and another side of the rim tape 9 may be attached to a part of the bottom surface 2a of the liquid crystal display panel 2. The rim tape 9 may have a width of about 1 mm to about 2 mm, but is not limited thereto. Examples of available rim tape 9 products may include 9294 and 9294B (manufactured by Minnesota Mining & Manufacture Company), and the like.

The backlight unit 1 and the liquid crystal display panel 2 may be secured to a chassis 8. The chassis 8 may be secured to the backlight unit 1 via a bonding film 11 placed on a lower side of the backlight unit 1 and on an upper side of the chassis 8. Any suitable bonding film, e.g., 9294 or 9294B (manufactured by Minnesota Mining & Manufacture Company), may be used as the bonding film 11.

A thermoplastic layer 12 may be deposited inside the liquid crystal display module to secure the backlight unit 1 and the liquid crystal display panel 2. The thermoplastic layer 12 may be a solidified product of a thermoplastic resin exhibiting viscosity of about 300 cps to about 1,000 cps at a temperature of about 120° C. to about 130° C. The thermoplastic layer 12 may be deposited on one side including the backlight unit 1 and the liquid crystal display panel 2 or between the chassis 8 and the one side including the backlight unit 1 and the liquid crystal display panel 2. The thermoplastic layer 12 may secure the backlight unit 1 and the liquid crystal display panel 2 to each other or may secure the backlight unit 1, the liquid crystal display panel 2, and the chassis 8 to one another.

In detail, the thermoplastic layer 12 may extend along at least one side to contact at least one lateral side surface 1b of the backlight unit 1 and at least one lateral side surface 2b of the liquid crystal display panel 2, e.g., the side surfaces 1b and 2b may face a same direction. For example, the thermoplastic layer 12 may overlap at least a majority of a length of each of the lateral side surfaces 1b and 2b of the backlight unit 1 and the liquid crystal display panel 2, respectively. A thickness of the thermoplastic layer 12 may be adjusted, so the thermoplastic layer 12 may extend along and contact only the liquid crystal display panel 2 and the backlight unit 1 or the thermoplastic layer 12 may also contact the chassis 8.

As discussed previously, the thermoplastic layer 12 may require a specific viscosity in order to secure the liquid crystal display panel 2 to the backlight unit 1 after stacking the liquid crystal display panel 2 on the backlight unit 1. That is, the thermoplastic layer 12 according to example embodiments may exhibit a viscosity of about 300 cps to about 1,000 cps at a temperature of about 120° C. to about 130° C., e.g., about 300 cps to about 600 cps at about 120° C. to about 130° C., in order to sufficiently secure the liquid crystal display panel 2 on the backlight unit 1.

If the viscosity of thermoplastic layer 12 is lower than 300 cps, the thermoplastic layer 12, i.e., the thermoplastic resin in the thermoplastic layer 12, may be too thin, i.e., the thermoplastic resin may not stop flowing due to excessively high fluidity after deposition. That is, a thin thermoplastic layer may not remain on the lateral surfaces of the liquid crystal display panel and backlight unit, e.g., may continue flowing toward a bottom of the backlight unit and the chassis, thereby failing to secure, e.g., connect, the backlight unit to the liquid crystal display panel.

If the viscosity of thermoplastic layer 12 is higher than 1,000 cps, the thermoplastic layer 12, i.e., the thermoplastic resin in the thermoplastic layer 12, may be too thick, e.g., discharge characteristics of the resin may be deteriorated. That is, the thermoplastic layer 12 may not be uniformly discharged, e.g., uniformly applied, in the liquid crystal display module, thereby failing to secure, e.g., connect, the backlight unit to the liquid crystal display panel.

When assembling the backlight unit 1 and the liquid crystal display panel 2 to form the liquid crystal display module, a molten thermoplastic resin may be deposited on the one side including the backlight unit 1 and the liquid crystal display panel 2 or between the chassis 8 and the one side. After deposition, the molten thermoplastic resin may be solidified to form a solidified product, i.e., the thermoplastic layer 12, at about 25° C., thereby securing the backlight unit 1 and the liquid crystal display panel 2 to each other, or securing the backlight unit 1, the liquid crystal display panel 2, and the chassis 8 to one another.

Since distances between the backlight unit 1, the liquid crystal display panel 2, and the chassis 8 are very narrow, the molten thermoplastic resin may be deposited via, e.g., injection. For example, the molten thermoplastic resin may be injected using a syringe facilitating temperature control and having a diameter of about 200 μm or less, without being limited thereto.

The thermoplastic resin may include at least one of hot-melt type silicone adhesives, ethylene-vinyl acetate resins, ethylene acetate-free vinyl resins, acrylic resins, phenolic resins, and epoxy resins The hot-melt type silicone adhesive is in solid phase at about 25° C. and is melted into liquid at a predetermined temperature (Tg) or more. After being deposited in a liquid state, the hot-melt type silicone adhesive is solidified at about 25° C. and secures the backlight unit, the liquid crystal display panel, and the chassis to one another. The hot-melt type silicone adhesive may have a weight average molecular weight of about 10,000 g/mol to about 200,000 g/mol.

The ethylene-vinyl acetate resin or the ethylene acetate-free vinyl resin is in solid phase at about 25° C. and is melted into liquid at a predetermined temperature (Tg) or more. After being deposited in a liquid state, the ethylene-vinyl acetate resin or the ethylene acetate-free vinyl resin is solidified at about 25° C. and secures the backlight unit, the liquid crystal display panel, and the chassis to one another. The ethylene-vinyl acetate resin may have a weight average molecular weight of about 10,000 g/mol to about 50,000 g/mol.

The phenolic resin may be at least one of, e.g., novolac type phenolic resins and resol type phenolic resins. The epoxy resin may be at least one of, e.g., bisphenol-A type epoxy resins and bisphenol-F type epoxy resins.

The thermoplastic layer 12, i.e., the solidified product of the thermoplastic resin, may further include a light shielding pigment. The light shielding pigment may shield light which can enter the liquid crystal display module. For example, the light shielding pigment may be at least one of black pigments and white pigments.

The thermoplastic layer 12, i.e., the solidified product of the thermoplastic resin, may further include a silane coupling agent. The silane coupling agent improves adhesion of the thermoplastic resin, so that the thermoplastic resin may more reliably secure the chassis. Any typical silane coupling agent, e.g., a vinyl group or a mercapto group containing silane coupling agent, may be used. For example, the silane coupling agent may include at least one of a polymeric unsaturated group containing silicon compounds, e.g., vinyltriethoxysilane, (meth)acryloxypropyltrimethoxysilane, trimethoxysilane, and the like, amino group containing silicon compounds, e.g., 3-aminopropyltrimethoxysilane, N-(2-aminoethyl)-3-aminopropyltrimethoxysilane, N-(2-aminoethyl)-3-aminopropylmethyldimethoxysilane, and the like, silicon compounds having an epoxy structure, e.g., 3-glycidoxypropyltrimethoxysilane, 3-glycidoxypropylmethyldimethoxysilane, 2-(3,4-epoxycyclohexyl)ethyltrimethoxysilane, and the like, and 3-chloropropyltrimethoxysilane.

Figure 2:
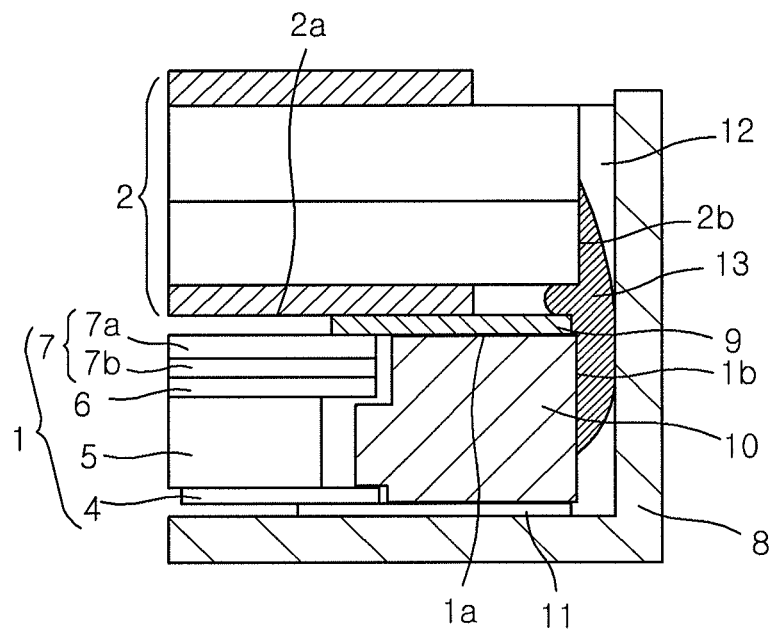
FIG. 2 illustrates a partial cross-sectional view of a liquid crystal display module in accordance with another exemplary embodiment.

The liquid crystal display module according to example embodiments may further include a cured product of a photo curable adhesive composition on one side including the backlight unit and the liquid crystal display panel, as will be explained in more detail below with reference to FIG. 2. FIG. 2 illustrates a partial cross-sectional view of a liquid crystal display module in accordance with another exemplary embodiment.

The liquid crystal display module in FIG. 2 may be substantially the same as the liquid crystal display module of FIG. 1, with the exception of additionally including a cured product 13 of a photo curable adhesive composition on one side of the liquid crystal display panel 2 and the backlight unit 1 or between the liquid crystal display panel 2, the backlight unit 1, and the chassis 8. The cured product 13 of the photo curable adhesive composition may primarily secure the backlight unit 1, the liquid crystal display panel 2, and the chassis 8.

The photo curable adhesive composition may include a urethane (meth)acrylate binder, a photo curable monomer, an adhesion improving monomer, and a photoinitiator, without being limited thereto. For example, the photo curable monomer may include at least one of a hydroxyl group-containing vinyl-based monomer, a carboxyl group-containing vinyl-based monomer, an alicyclic ring-containing vinyl-based monomer, and an alkyl group-containing vinyl-based monomer.

After the cured product 13 of the photo curable adhesive composition is formed and applied to the liquid crystal display module, the thermoplastic layer 12 may be formed on one side including the backlight unit 1 and the liquid crystal display panel 2, or between the chassis 8 and the one side. For example, as illustrated in FIG. 2, portions of the thermoplastic layer 12 may be between the chassis 8 and the cured product 13. For example, the cured product 13 may be applied to contact the lateral surfaces 1b and 2b of the backlight unit 1 and the liquid crystal display panel 2, and the thermoplastic layer 12 may be applied to fill a remaining space defined by the chassis 8, cured product 13, and the one side. The solidified product of the thermoplastic layer 12 may secondarily secure the backlight unit 1, the liquid crystal display panel 2, and the chassis 8. For example, the solidified product of the thermoplastic layer 12 may be formed on one side including the backlight unit 1 and the liquid crystal display panel 2 and between the chassis 8 and the liquid crystal display module.

In accordance with another aspect of the example embodiments, a method for forming the liquid crystal display module may be provided. The method may include injecting a molten thermoplastic resin onto at least one side including lateral surfaces 1b and 2b of the backlight unit 1 and the liquid crystal display panel 2. The thermoplastic resin may form a thermoplastic layer 12 exhibiting viscosity of about 300 cps to about 1,000 cps at a temperature of about 120° C. to about 130° C.

Next, the constitution and functions of the example embodiments will be explained in more detail with reference to the following examples. These examples are provided for illustrative purposes only and are not to be in any way construed as limiting the example embodiments. A description of details apparent to those skilled in the art will be omitted.

EXAMPLES

Example 1

A 1 mm width rim tape (9294 or 9294B obtained from 3M) was bonded to a top surface of a backlight unit including a reflective sheet, a light guide plate, a diffuser sheet, prism sheets, and an upper glass plate. Then, a liquid crystal display panel was bonded to the rim tape and secured to a chassis. An ethylene-vinyl acetate resin (vinyl acetate adhesive 330, Ogong Bond Co., Ltd., Korea) was melted to have viscosity of 500 cps at 120° C., followed by injection using a 100 mL syringe (Musashi, Japan) onto adjacent lateral surfaces of the backlight unit and liquid crystal display panel to form a substantially uniform molten layer. The molten layer was allowed to cool to room temperature and solidify to form the thermoplastic layer. The viscosity of the molten ethylene-vinyl acetate resin was measured at 120° C. using a DV-II+ viscometer (Brookfield Co., Ltd., Germany) at 100 rpm with Spindle No. #7 after placing 400 g of the resin in a 500 ml Nalgene bottle (73.8 mm outer diameter×169.8 mm height).

Example 2

A liquid crystal display module was obtained by the same method as in Example 1, except that a molten mixture of a hot-melt type silicone adhesive HM-2500 (viscosity: 500 cps at 120° C., Dow Corning Co., Ltd., U.S.A.) and a silane coupling agent (3-glycidylpropyl triethoxysilane) was used instead of the molten ethylene-vinyl acetate resin. The hot-melt type silicone adhesive HM-2500 and silane coupling agent were mixed at a weight ratio of 1:1.

Example 3

A liquid crystal display module was obtained by the same method as in Example 1, except that a molten epoxy resin 1386 (cream color, viscosity: 300 cps at 120° C., 3M Korea Co., Ltd.) was used instead of the molten ethylene-vinyl acetate resin.

Example 4

A liquid crystal display module was obtained by the same method as in Example 1, except that a molten phenolic resin KC-2636HV (viscosity: 300 cps at 120° C., Gangnam Chemicals Co., Ltd., Korea) was used instead of the molten ethylene-vinyl acetate resin.

Comparative Example 1

A liquid crystal display module was obtained by the same method as in Example 1, except that HJ-4000 (viscosity: 10 cps at 120° C., Brothers Industry Co., Ltd., Korea) was used instead of the molten ethylene-vinyl acetate resin.

Comparative Example 2

A liquid crystal display module was obtained by the same method as in Example 1, except that HM-2500 (viscosity: 210,000 cps at 120° C., Dow Corning Co., Ltd., U.S.A.) was used instead of the ethylene-vinyl acetate resin.

Experiment: Effectiveness Evaluation in Assembly of Mobile Phone

Evaluation results with respect to the liquid crystal display modules according to Examples 1 to 4 and Comparative Examples 1 and 2 are listed in Table 1. The thickness of each thermoplastic layer was measured using an optical microscope (MA200, Nikon, Japan) after deposition and photocuring thereof. Sheet penetration of the liquid thermoplastic resin was evaluated with the naked eye.

TABLE 1

|  | Example 1 | Example 2 | Example 3 | Example 4 | Comparative Example 1 | Comparative Example 2 |
| --- | --- | --- | --- | --- | --- | --- |
| Attachment effect | Good | Good | Good | Good | Poor | Good |
| Thickness after deposition | 205 μm | 220 μm | 210 μm | 240 μm | 120 μm | 350 μm |
| Penetration of resin | No | No | No | No | Yes | No |

As can seen from Table 1, the liquid crystal display modules according to the Examples 1-4 exhibited good attachment effects, had thin thicknesses after deposition, and did not exhibit resin penetration. On the contrary, in the liquid crystal display module according to Comparative Example 1, in which the viscosity of the resin was excessively low, the liquid resin penetrated into a sheet layer, thereby generating stains, and did not exhibit sufficient adhesion to attach the backlight unit and the liquid crystal display panel. Further, in the liquid crystal display module according to Comparative Example 2, in which the viscosity of the resin was excessively high, thickness control of the resin failed.

Therefore, a liquid crystal display module according to an example embodiment may include a thermoplastic layer extending along and connecting lateral sides of the liquid crystal display panel and the backlight unit to improve attachment thereof without reducing light transmittance through front/back surfaces of the backlight unit and liquid crystal display panel. The thermoplastic layer may be a solidified product of a thermoplastic resin, which has a viscosity of about 300 cps to about 1,000 cps at a temperature of about 120° C. to about 130° C. in order to provide a uniform layer with a sufficient thickness on the lateral sides of the liquid crystal display panel and the backlight unit. As such, the liquid crystal display module according to example embodiments may exhibit improved stability and rigidity, while having improved display properties, e.g., an enlarged display window of a mobile phone.

In contrast, a conventional liquid crystal display module may include an adhesive tape, e.g., an adhesive double-sided tape, between a top surface of a backlight unit and a bottom surface of a liquid crystal display panel to secure the backlight unit to the liquid crystal display panel. However, as a width of the conventional adhesive tape is about 2.1 mm to about 2.2 mm, there may be a limit to a size of a display window of a liquid crystal display module, e.g., the size of the tape and overall size of a mobile phone may cause a display window of the mobile phone to be relatively small. Further, it may be physically difficult to perform any manufacturing operations with an adhesive tape having a width of about 1 mm or less, e.g., adhesion of such an adhesive tape may by significantly deteriorated, thereby reducing adhesion between a window glass material used for the liquid crystal display panel and a polycarbonate material used for the backlight unit. As such, coupling between the backlight unit and the liquid display panel in a conventional liquid crystal display module may be damaged or completely broken upon impact. Further, when a photo curable material is added to the conventional adhesive tape, the photo curable material may be modified to increase its degree of transparency and to facilitate curing of the material. However, light leakage can occur through a gap between the chassis and a window layer.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the example embodiments as set forth in the following claims.

What is claimed is:

1. A liquid crystal display module, comprising:
   a backlight unit;
   a liquid crystal display panel on a top surface of the backlight unit; and
   a thermoplastic layer on at least one lateral surface of the backlight unit and at least one lateral surface of the liquid crystal display panel, the thermoplastic layer including a solidified thermoplastic resin exhibiting viscosity of about 300 cps to about 1,000 cps at a temperature of about 120° C. to about 130° C.,
   further comprising rim tape between the backlight unit and the liquid crystal display panel, wherein the rim tape has a width of about 2 mm or less, further comprising a cured product of a photo curable adhesive composition on the at least one lateral surface of the backlight unit and on the at least one lateral surface of the liquid crystal display panel,
wherein the thermoplastic resin includes at least one of a hot-melt type silicone adhesive, an ethylene-vinyl acetate resin, an ethylene acetate-free vinyl resin, an acrylic resin, a phenolic resin, and an epoxy resin.

2. The liquid crystal display module as claimed in claim 1, wherein the backlight unit and the liquid crystal display panel are secured inside a chassis.

3. The liquid crystal display module as claimed in claim 1, wherein the thermoplastic resin includes the hot-melt type silicone adhesive, the hot-melt type silicone adhesive having a weight average molecular weight of about 10,000 g/mol to about 200,000 g/mol.

4. The liquid crystal display module as claimed in claim 1, wherein the thermoplastic resin includes the ethylene-vinyl acetate resin, the ethylene-vinyl acetate resin having a weight average molecular weight of about 10,000 g/mol to about 50,000 g/mol.

5. The liquid crystal display module as claimed in claim 1, wherein the thermoplastic resin includes the phenolic resin, the phenolic resin including at least one of a novolac type phenolic resin and a resol type phenolic resin.

6. The liquid crystal display module as claimed in claim 1, wherein the thermoplastic resin includes the epoxy resin, the epoxy resin including at least one of a bisphenol-A type epoxy resin and a bisphenol-F type epoxy resin.

7. The liquid crystal display module as claimed in claim 1, wherein the thermoplastic layer further comprises a light shielding pigment.

8. The liquid crystal display module as claimed in claim 7, wherein the light shielding pigment includes at least one of a black pigment and a white pigment.

9. The liquid crystal display module as claimed in claim 1, wherein the thermoplastic layer further comprises a silane coupling agent.

10. The liquid crystal display module as claimed in claim 1, wherein the cured product directly contacts the thermoplastic layer, the backlight unit, the liquid crystal display panel, and a chassis.

11. The liquid crystal display module as claimed in claim 1, wherein the thermoplastic layer is only on the lateral surfaces of the backlight unit and the liquid crystal display panel, light from the backlight unit being emitted from the top surface of the backlight unit toward a bottom surface of the liquid crystal display panel.

12. The liquid crystal display module as claimed in claim 1, wherein the thermoplastic layer extends along and directly contacts each of the lateral surfaces of the backlight unit and the liquid crystal display panel, the thermoplastic layer being between the liquid crystal display panel and a lateral side of a chassis.

* * * * *